United States Patent [19]

Mencarelli et al.

[11] Patent Number: 5,467,590
[45] Date of Patent: Nov. 21, 1995

[54] RAKING TOOL

[76] Inventors: Albert E. Mencarelli, 1050 E. Lake Rd., Oakdale, Conn. 06370; Richard A. Mencarelli, 11 High St., Groton, Conn. 06340

[21] Appl. No.: 307,302

[22] Filed: Sep. 16, 1994

[51] Int. Cl.[6] .................................................. A01D 7/06
[52] U.S. Cl. ................................ 56/400.17; 56/400.21
[58] Field of Search .......................... 56/400.17, 400.01, 56/400.18, 400.19, 400.21

[56] References Cited

U.S. PATENT DOCUMENTS

| | | |
|---|---|---|
| 2,193,070 | 3/1940 | Lambert . |
| 2,479,877 | 8/1949 | Storm et al. ................. 56/400.19 |
| 2,536,607 | 1/1951 | Jenkins . |
| 2,790,296 | 4/1957 | Bernstein ..................... 56/400.19 |
| 4,848,074 | 7/1989 | Allen . |
| 4,985,961 | 1/1991 | Kegley ........................ 56/400.17 |

*Primary Examiner*—Terry Lee Melius
*Attorney, Agent, or Firm*—Albert W. Hilburger

[57] ABSTRACT

A raking tool comprises an elongated handle and a rake head mounted to a distal end of the handle. The rake head includes a support plate with a plurality of integral tines extending therefrom in mutually diverging directions between first and second edges laterally disposed relative to a longitudinal axis of the handle. The rake head is asymmetrically disposed relative to the handle, the first edge being substantially aligned with the longitudinal axis of the handle, the second edge being angularly disposed relative thereto. A first hand grip member is mounted at the proximal end of the handle and extends transversely thereof and a second hand grip member is mounted to the handle at a location spaced from the proximal end and extends in a direction angularly disposed relative to both the first hand grip member and the longitudinal axis. The support plate has a threaded mounting socket therein and the distal end of the handle is threaded for selective mounting engagement with the mounting socket.

5 Claims, 2 Drawing Sheets

RAKING TOOL

BACKGROUND OF THE INVENTION

1. Field of the Invention

The present invention relates generally to raking tools and, more particularly, to a novel construction of a raking tool intended to greatly increase the efficiency of the user. While the present invention is described and illustrated herein in the form of a leaf rake, the invention need not be so limited. The invention is intended to cover all manner of raking tools, one end of which is drawn along the ground, whether lawn, garden, or otherwise, to collect leaves and other debris, gather the collected material in the form of a pile, or otherwise, then dispose of it in some suitable manner.

2. Description of the Prior Art

Conventional raking tools are typically constructed in the general manner disclosed by Lambert in U.S. Pat. No. 2,193,070 which includes a rake head comprised of a plurality of flexible tines symmetrically disposed in a lateral array on either side of an elongated handle.

In some instances, as disclosed by Jenkins in U.S. Pat. No. 2,536,607, the rake head of a raking tool can be adjustably attached and positioned relative to an elongated handle. Jenkins also discloses an elongated handle for the raking tool which has upper and lower tubular telescoping elements and a pair of transversely extending hand grips mounted, respectively, on the upper and lower elements. While the position of the lower hand grip is adjustable along the length of the lower telescoping element, the position of the upper hand grip is fixed. When a user holds the hand grips and manipulates the raking tool in the intended manner, the effective length of the raking tool automatically varies with the sweeping motion performed by the user.

Another variation of a raking tool is disclosed by Allen in U.S. Pat. No. 4,848,074. That patent discloses a rake-like device for grasping and lifting a pile of fallen leaves and comprises an elongated hollow handle with a rake head attached to its lowermost extremity. The rake head is comprised of a circular array of flexible metal tines whose tips define a circle. A cable disposed within the handle extends in a loop configuration to engage with eyes associated with the tines. When the cable is pulled upwardly, the tines move radially in unison in an upwardly convergent manner. When the pulling force is removed, the tines return to their outwardly disposed positions.

It was in light of the foregoing prior art that the present invention was conceived and has now been reduced to practice.

SUMMARY OF THE INVENTION

According to the present invention, a raking tool comprises an elongated handle and a rake head mounted to a distal end of the handle. The rake head includes a support plate with a plurality of integral tines extending therefrom in mutually diverging directions between first and second edges laterally disposed relative to a longitudinal axis of the handle. The rake head is asymmetrically disposed relative to the handle, the first edge being substantially aligned with the longitudinal axis of the handle, the second edge being angularly disposed relative thereto. A first hand grip member is mounted at the proximal end of the handle and extends transversely thereof and a second hand grip member is mounted to the handle at a location spaced from the proximal end and extends in a direction angularly disposed relative to both the first hand grip member and the longitudinal axis. The support plate has a threaded mounting socket therein and the distal end of the handle is threaded for selective mounting engagement with the mounting socket.

A primary object of the invention is to provide a novel raking tool intended to improve the comfort and efficiency of the user.

Another object of the invention is to provide such a novel raking tool which is of a simplified construction, utilizes existing materials, and is inexpensive to manufacture and maintain.

A further object of the invention is to provide such a novel raking tool which comprises an elongated handle and a rake head mounted to the distal end of the handle, the rake head including a support plate and a plurality of integral tines extending from the support plate in mutually diverging directions between first and second edges laterally disposed relative to said longitudinal axis, the rake head being asymmetrically disposed relative to said handle, the first edge being substantially aligned with the longitudinal axis, the second edge being angularly disposed with respect to the longitudinal axis of the handle. With this construction, a user holding the raking tool with the first edge nearest his/her body and with the rake head generally perpendicular thereto is able to draw the rake head proximate his/her body, generally parallel thereto, and without substantial interference with his/her feet.

Still another object of the invention is to provide such a raking tool in which the elongated handle includes first and second hand grips extending transverse of the longitudinal axis, the second hand grip extending in a direction angularly disposed relative both to the first hand grip and to the longitudinal axis. With such a construction, in one instance, the first hand grip can operate as a fulcrum as the user advances the raking tool by means of the second hand grip and, in another instance, the second hand grip can operate as a fulcrum as the user advances the raking tool by means of the first hand grip.

Yet another object of the invention is to provide such a raking tool in which, to assure the comfort of the user, the hand grips are adjustable both along the length of the elongated handle and in azimuth about the handle.

Still a further object of the invention is to provide such a raking tool in which the handle grips are rotatably mounted on spindles whose axes extend transversely of the longitudinal axis of the elongated handle.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENTS

Figure 2:
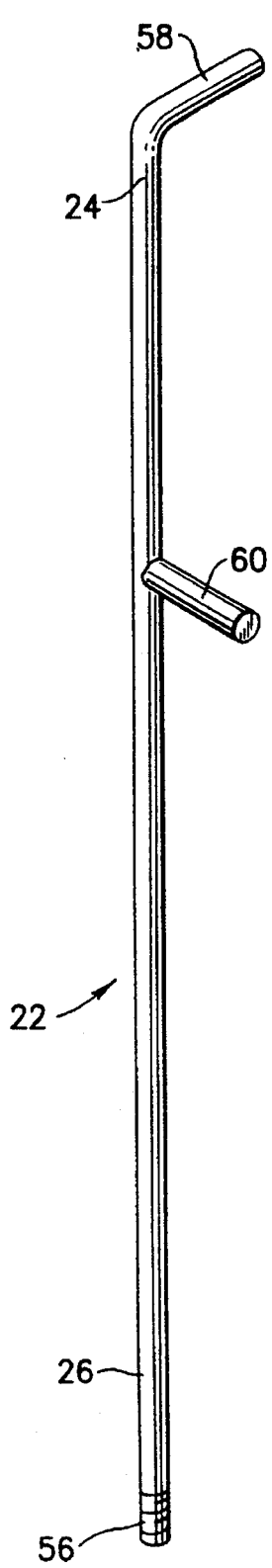
FIG. 2 is a perspective view of one embodiment of an elongated handle which may be a component of the raking tool of the present invention.
Figure 1:
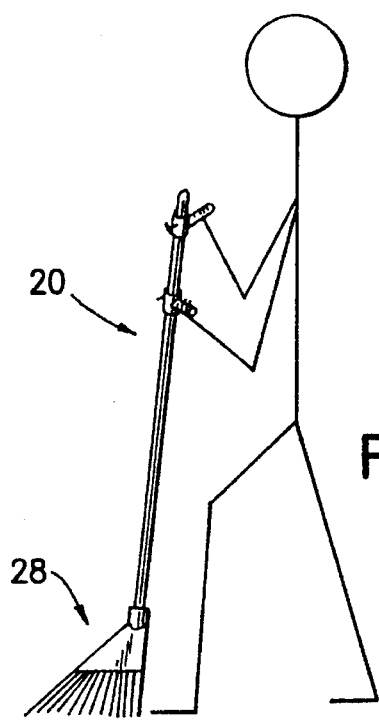
FIG. 1 is a perspective view of a raking tool embodying the present invention, the raking tool being illustrated in use.

Turn now to the drawings and, initially, to FIG. 1 which illustrates a raking tool 20 embodying the invention, as it is being put to use. In a first embodiment, as seen in FIG. 2, the raking tool 20 includes an elongated handle 22 having a longitudinal axis and extending between a proximal end 24 and a distal end 26. Viewing especially FIG. 3, a rake head 28 is shown mounted to the distal end of the handle.

Figure 4:
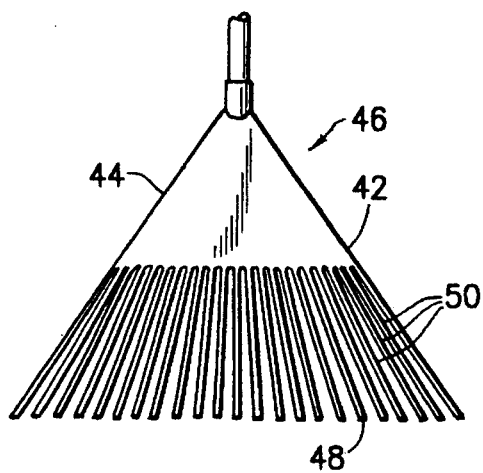
FIG. 4 is a front elevation view illustrating a known construction of a rake head.

The rake head 28 includes a support plate 30 and a plurality of integral tines 32 extending from the support plate in mutually diverging directions between first and second edges 34, 36 laterally disposed relative to the longitudinal axis of the handle 22. The rake head is asymmetrically disposed relative to the handle 22, the first edge 34 being substantially aligned with the longitudinal axis of the handle, the second edge 36 being angularly disposed with respect to the longitudinal axis. Indeed, preferably, the second edge 36 intersects the ground 38 at an acute angle with the longitudinal axis of the handle being substantially perpendicular thereto, as seen in FIG. 2. In this manner, the dimension of the ground engaging portion of the rake head 46, that is, the distance between the first edge 34 and the second edge 36 of the rake head as measured along successive extremities 40 of the tines 32 is at least equivalent to a distance similarly measured between opposed edges 42, 44 of a conventional rake head 46 (FIG. 4) as measured along successive extremities 48 of a plurality of tines 50.

In this manner, a user holding the raking tool with the first edge 36 nearest his/her body is able to draw the raking tool proximate his/her body and in a sweep which is generally parallel thereto. At the same time, the improved rake head covers an expanse of ground which is at least as extensive as that of the conventional rake head 46. Still a further advantage lies in the ability of an extreme lateral tip 52 (FIG. 3) to reach into crevices and beneath shrubbery, and the like, to collect the material being sought.

Figure 3:
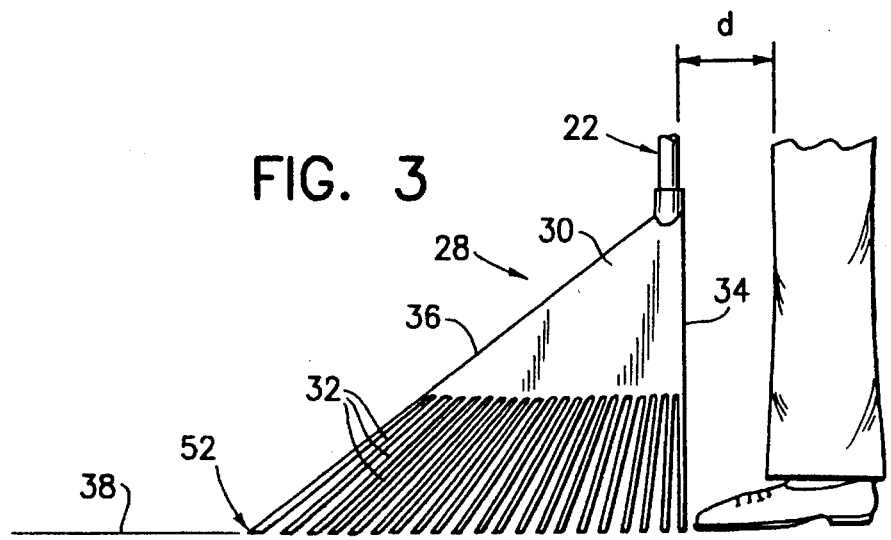
FIG. 3 is a front elevation view illustrating one embodiment of a novel rake head which may be a component of the raking tool of the present invention.

With continued attention being directed to FIG. 3, the rake head 28 is illustrated as having a threaded mounting socket 54 therein for threaded reception of screw threads 56 at the distal end 26 of the handle 22. This construction enables the selective mounting engagement of the handle 22 with the mounting socket of the support plate. Thus, when a rake head 28 becomes unduly worn or broken, it can be readily removed from the handle 22 and replaced. Of course, the converse is also true.

Returning now to FIG. 2, the elongated handle 22 is seen to include a first hand grip member 58 at its proximal end 24, the hand grip member extending transverse of the longitudinal axis of the handle. The hand grip member 58 is illustrated as being of unitary construction with the handle but it will be understood that it may be of separate construction, then suitably attached to the handle so as to be integral therewith. A second hand grip member 60 is suitably fixed to the handle 22 at a location spaced from the proximal end 26 and extending in a direction angularly disposed relative both to the first hand grip member 58 and to the longitudinal axis of the handle. While it is preferable for the hand grip members 58, 60 to be perpendicular to the longitudinal axis of the handle 22, it is not preferred that they lie in mutually perpendicular planes but rather that they be positioned in a manner to assure optimum comfort of the user.

By reason of this construction, in one instance, the first hand grip member can operate as a fulcrum as the user advances, or sweeps with, the raking tool by means of the second hand grip member. Likewise, in another instance, the second hand grip member can operate as a fulcrum as the user advances, or sweeps with, the raking tool by means of the first hand grip member.

Figure 5:
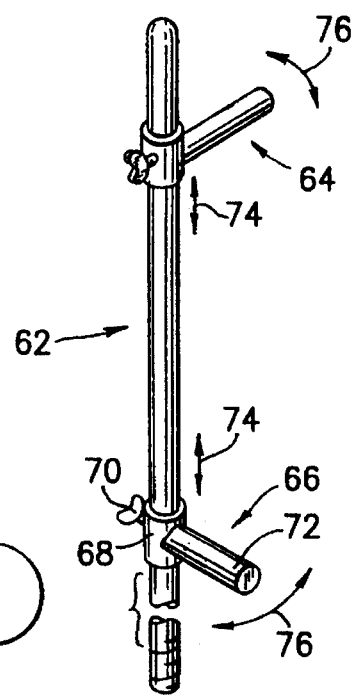
FIG. 5 is a perspective view of another embodiment of an elongated handle which may be a component of the raking tool of the present invention.

Turn now to FIG. 5 which, at 62, illustrates another embodiment of a handle for the raking tool of the invention. In this instance, the elongated handle 62 has a circular cross section and includes first and second modified hand grip members 64, 66. The hand grip members 64, 66 are positioned generally in the same manner as the hand grip members 58, 60, although as will be described, the former offer the user the ability to custom position them on the handle, both lengthwise thereof and azimuthally.

In each instance, the hand grip members include a cylindrical collar 68 slidably received on the elongated handle 62. A suitable locking device is provided on the collar 68 for selectively fixing it in a desired position on the handle. The locking device is represented in the drawing as a wing set screw 70 threadedly engaged with and extending through the collar so as to selectively engage the outer peripheral surface of the handle 62. When so engaged with the handle, the set screw 70 holds the collar fast on the handle and when the set screw is disengaged from the handle, the collar is free to move longitudinally along the length of the handle as well as around its periphery.

Each hand grip member 64, 66 includes gripping portions 72 which are fixed to the collar 68 and extend away from the collar so as to be substantially perpendicular to the handle.

With this construction, it will be appreciated that both hand grip members 64, 66 are independently adjustable longitudinally of the handle 62 as indicated by double arrow heads 74 and are also independently adjustable azimuthally of the handle 62 as indicated by double arrow heads 76, albeit in planes which are perpendicular to the longitudinal axis of the handle.

Figure 6:
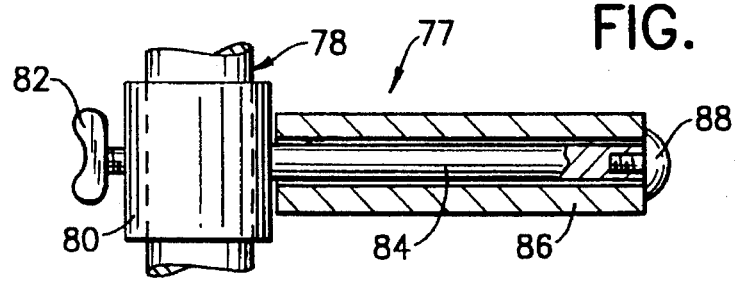
FIG. 6 is a detail side elevation view, partly cut away and shown in section, illustrating still another embodiment of a component of the invention.

Turn now to FIG. 6 for a description of another embodiment 77 of the hand grip members, revised from those members 64, 66 illustrated in FIG. 5. In this instance, again, an elongated handle 78 has a circular cross section and, similar to the FIG. 5 construction, each of the hand grip members 77 includes a cylindrical collar 80 slidably received on the elongated handle. A selectively operable locking device in the form of a wing set screw 82 is threadedly engaged with the collar and engageable with the outer peripheral surface of the handle for selectively fixing the collar in position on the handle. A spindle 84 is fixed to the collar and extends radially away from the collar so as to be substantially perpendicular to the handle. A tubular gripping portion 86 is rotatably journaled on the spindle and a stop screw 88 with an enlarged head is threadedly engaged with the end of the spindle 84 to retain the gripping portion in place. It will be appreciated that the gripping portion 86 is sufficiently shorter than the spindle 84 so that there is no binding between the gripping portion and either the stop screw 88 or the collar 80.

This construction for the hand grip members enables the user to perform the sweeping movement of the raking tool with maximum ease using primarily the arms, and with minimal exertion being imposed on the back of the user. Also, there is none of the frictional engagement between tool and hands which previously resulted in abrasion of the user's palms and, oftentimes, undesirably, blisters.

Figure 7:
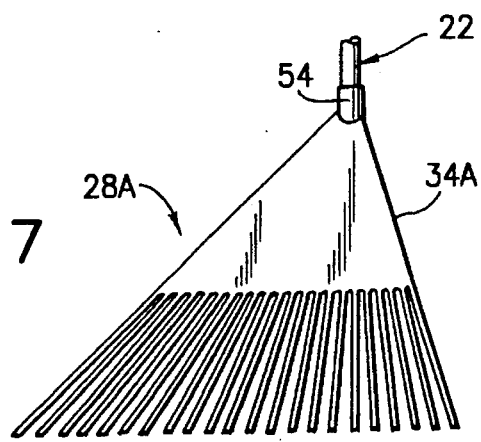
FIG. 7 is a front elevation view illustrating another embodiment of a novel rake head which may be a component of the raking tool of the present invention.

While the construction of the rake head 28 illustrated in FIG. 3, with the first edge 34 substantially parallel with the longitudinal axis of the handle 22 is preferred because the rake head is thereby positioned most closely to the body of the user, other variations of that construction may be used while remaining within the scope of the invention. For example, as seen in FIG. 7, a modified rake head 28A may be used which is still asymmetrical but with a modified first edge 34A which diverges slightly away from the centerline of the handle 22 with increased distance away from a modified support plate 30A.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A raking tool comprising:
    an elongated handle having a longitudinal axis and extending between a proximal end and a distal end;
    a rake head mounted to said distal end of said handle, said rake head including:
        a support plate; and
        a plurality of integral tines extending from said support plate to extremities in mutually diverging directions between first and second edges laterally disposed relative to said longitudinal axis, said rake head being asymmetrically disposed relative to said handle, said first edge being substantially aligned with said longitudinal axis, said second edge being angularly disposed with respect to said longitudinal axis, an imaginary line joining said extremities being substantially perpendicular to said first edge;
        thereby enabling a user holding said raking tool such that said first edge is nearest the person of the user to draw said raking tool proximate his/her body and generally parallel thereto.

2. A raking tool as set forth in claim 1
    wherein said elongated handle includes:
        first hand grip means at said proximal end of said handle extending transverse of said longitudinal axis; and
        second hand grip means fixed to said handle at a location spaced from said proximal end and extending in a direction angularly disposed relative to both said first hand grip member and to said longitudinal axis;
        whereby, in one instance, said first hand grip member can operate as a fulcrum as the user advances said raking tool by means of said second hand grip member; and
        whereby, in another instance, said second hand grip member can operate as a fulcrum as the user advances said raking tool by means of said first hand grip member.

3. A raking tool as set forth in claim 2
    wherein said elongated handle has a circular cross section; and
    wherein each of said first and second hand grip means includes:
        a cylindrical collar slidably received on said elongated handle;
        locking means on said collar for selectively fixing said collar in position on said handle; and
        a hand grip member fixed to said collar and extending away therefrom so as to be substantially perpendicular to said handle.

4. A raking tool as set forth in claim 1
    wherein said support plate has a threaded mounting socket therein; and
    wherein said distal end of said handle is threaded for selective mounting engagement with said mounting socket.

5. A raking tool as set forth in claim 2
    wherein said elongated handle has a circular cross section; and
    wherein each of said first and second hand grip means includes:
        a cylindrical collar slidably received on said elongated handle;
        locking means on said collar for selectively fixing said collar in position on said handle;
        a spindle fixed to said collar and extending away therefrom so as to be substantially perpendicular to said handle; and
        a hand grip member rotatably journaled on said spindle.

\* \* \* \* \*